May 24, 1932.　　　　F. SWIHART　　　　1,859,348
DEVICE FOR REMOVING HUB ASSEMBLIES FROM AXLES
Filed June 12, 1930
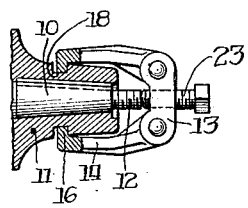
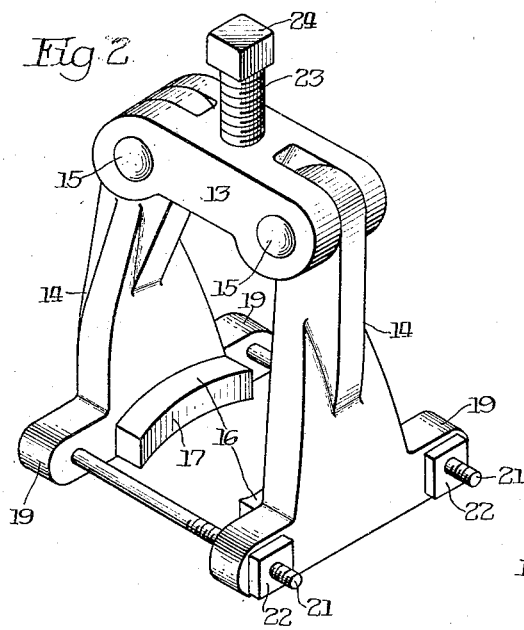
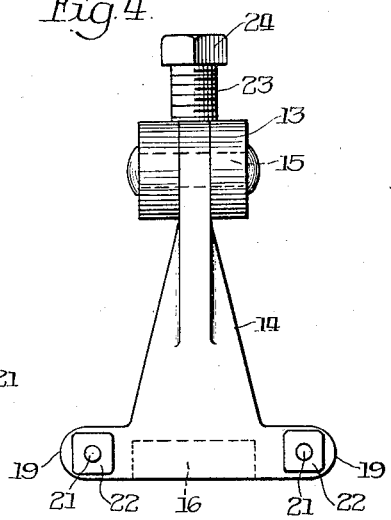
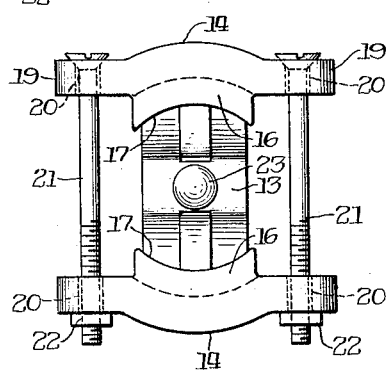
Inventor:
Frank Swihart.
By Chindahl Parker & Carlson
Attys Patented May 24, 1932

1,859,348

UNITED STATES PATENT OFFICE

FRANK SWIHART, OF WARSAW, INDIANA, ASSIGNOR TO THE DALTON FOUNDRIES INC., OF WARSAW, INDIANA, A CORPORATION OF INDIANA

DEVICE FOR REMOVING HUB ASSEMBLIES FROM AXLES

Application filed June 12, 1930. Serial No. 460,555.

The invention has reference to a device for removing hub assemblies from the axles and particularly to devices of this character adapted for operation on the hub and axle assemblies of motor vehicles.

An object of the invention is to provide a device of this nature by which the hub assembly may be quickly and easily removed and which is simple in operation, adjustable for use on various types and sizes of hub assemblies, is of sturdy construction, and may be manufactured at a low cost.

More specifically stated, an object of the invention resides in the provision of a new and improved device for removing hub assemblies from axles in which a yoke member has laterally adjustable arms, each of which carries a hub engaging part of substantial size, said yoke including means thereon for clamping or securing said hub engaging parts in position and having means arranged to engage the axle when the parts are so clamped to exert a relative axial stress in a separating direction between the engaged hub assembly and the axle.

In connection with the foregoing object the parts are arranged so that construction thereof from heavy, strong material is possible without interfering with or impairing the operation of the device thereby providing a device capable of exerting enormous force to effect separation of the parts.

Other objects and advantages will become apparent in the following description and from the foregoing objects, in which:

Figure 1 shows in elevation a device, embodying the features of the invention, as it is used, parts being broken away to clarify the view.

Fig. 2 is a perspective view of the device.

Fig. 3 is a plan view of the hub engaging end of the device.

Fig. 4 is a side elevation.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claim.

In certain mechanical organizations and particularly in motor vehicles, constructions are commonly provided in which an axle carries a hub assembly for a wheel or the like rigidly secured thereto by arrangements of keys and slots, nuts and bolts and the like. This assembly of axle and hub is very snug and is seldom disturbed. Consequently, after a period of use, the parts become so firmly fixed together that they may be separated only with great difficulty by ordinary mechanical means when it does become necessary to remove the hub for repair or replacement of parts.

In the present invention, the device is arranged to provide an intermediate engagement between the hub and the axle and has means thereon operable to exert an enormous force for moving said parts relatively in an axial direction. Referring more particularly to the drawings, 10 (Fig. 1) designates an axle on which a hub assembly 11 is mounted. Normally, a nut (not shown) engages the screw-threaded end 12 of the axle to maintain the hub assembly in place.

A preferred form of device is shown in Figs. 2, 3 and 4 as being in the nature of a yoke comprising a back or base bar 13, having arms 14 extending in the same direction from opposite ends thereof. The arms 14 are pivotally secured to the base, as at 15, for movement toward and away from each other in substantially the same plane. Each arm 14, at its free end, has a transverse, inwardly turned flange 16 of substantial length, and these flanges are preferably arranged in opposed relation. The inner faces of the flanges are arcuate as indicated at 17, to facilitate engagement of the flanges with a surface portion of the cylindrical hub.

Generally, the hubs of motor vehicles include an annular groove 18 (see Fig. 1) formed in the outer surface thereof and the flanges 16 are fashioned to engage this groove. However, such flanges may, where no groove is provided, be engaged with any suitable projecting portion of the hub with satisfactory results. The arms 14 on either side of and alined with the flanges 16 have laterally or outwardly extending bosses or lugs 19 in opposed pairs of which are registering apertures 20 (Fig. 3). The apertures receive elongated headed bolts 21 which are screwthreaded a substantial distance to receive nuts 22 for drawing the flanges 16 into rigid engagement with the hub.

It will be seen that, since the bosses 19 are located in the plane of the arms, the nuts 22 may be threaded onto the bolts from an easily accessible position on the outer side of the arms. The use of the two bolts provides great security and rigidity of the parts during use.

The base bar carries means by which, when the flanges are clamped against the hub, a force may be exerted between the axle and the device for effecting a relative separating movement to withdraw the hub axially from the axle. In one form, the base 13 is tapped centrally thereof to receive a heavy screw 23. The relation of parts is such that the axis of said screw is substantially coincident with the axis of the axle when the flanges are in engagement therewith. The outer end of the screw 23 is squared, as at 24, or otherwise suitably formed for engagement by an operating tool.

The device is simple in its operation. The nut or other means which normally secures the hub assembly on the axle is first removed after which the arms 14 are spread apart and slipped over the end of the axle to engage the arcuate surfaces 17 on the flanges 16 with the groove 18 or with other suitable parts of the hub assembly. The nuts 22 are then tightened to clamp the flanges tightly against the hub. This positions the screw 23 in alinement with the axis of the axle so that the workman can turn the screw until it engages the end of the axle. Continued application of force to the screw results in an outward movement of the hub assembly relative to the axle to separate the parts.

It will be apparent that the arrangement of parts permits them to be fashioned of heavy material without impairing the operation thereof. Consequently, if the parts have a tendency to stick even when the separating force is applied, the operator may strike or tap the head 24 of the screw after the screw has been tightened to facilitate separation thereof without danger of breaking the device. The substantial length of the arcuate hub-engaging surfaces 17 insures that a large portion of the hub will be engaged thereby to effectively transfer the separating force thereto over a large portion of the circumference of the hub. Thus, a uniformly distributed force is applied to the hub which effects the desired separation thereof from the axle most efficiently. A further feature of the device is its adjustability for use in connection with hub assemblies of different types and sizes.

I claim as my invention:

A device for removing hub assemblies from axles having, in combination, a yoke adapted to straddle the free end of an axle on which a hub is mounted, said yoke comprising a base member and a pair of spaced arms having wide outer ends tapering into a relatively narrow portion, means for pivotally securing said arms to said base through said relatively narrow portions, elongated and narrow flanges on the inner faces of the arms and extending transversely of the wide ends of the arms, said flanges being opposed and having arcuate faces to engage an annular groove in the hub assembly, lugs on both sides of the arms extending laterally therefrom on the line of said flanges, bolts extending through corresponding pairs of lugs for drawing said arms toward an interposed hub assembly and securing them in such position, and means on said base arranged to engage said axle and movable to exert a separating force between the axle and yoke.

In testimony whereof, I have hereunto affixed my signature.

FRANK SWIHART.